(12) United States Patent
Wilk

(10) Patent No.: US 8,126,743 B1
(45) Date of Patent: Feb. 28, 2012

(54) METHOD AND APPARATUS FOR MANAGING THE SELECTION OF BENEFIT OPTIONS

(75) Inventor: Adam Wilk, Highland Village, TX (US)

(73) Assignee: Intuit Inc., Mountain View, CA (US)

( * ) Notice: Subject to any disclaimer, the term of this patent is extended or adjusted under 35 U.S.C. 154(b) by 1530 days.

(21) Appl. No.: 11/262,191

(22) Filed: Oct. 28, 2005

(51) Int. Cl.
*G06Q 40/00* (2006.01)

(52) U.S. Cl. .............................. 705/4; 705/2

(58) Field of Classification Search ............. 705/2–4
See application file for complete search history.

(56) References Cited

U.S. PATENT DOCUMENTS

| | | | |
|---|---|---|---|
| 2002/0010597 A1* | 1/2002 | Mayer et al. | 705/2 |
| 2005/0033609 A1* | 2/2005 | Yang | 705/2 |
| 2006/0265255 A1* | 11/2006 | Williams | 705/4 |

OTHER PUBLICATIONS www.ehealthinsurance.com; ehealthinsurance Services, Inc.; 2004.
Powell, E.A., "Private Health Insurance is Available"; Associated Press; Aug. 14, 2003.

\* cited by examiner

*Primary Examiner* — Olabode Akintola
(74) *Attorney, Agent, or Firm* — Osha • Liang LLP

(57) ABSTRACT

A method for managing the selection of benefit options includes receiving historical user data covering a first time period, and receiving benefit information including at least one benefit option applicable to a second time period. A first portion of the historical user data is compared with a portion of the benefit information to determine anticipated future costs associated with the at least one benefit option. A user of the method optionally selects one of the available benefit options based on the comparison. The benefit options include at least two different insurance policies available for selection. The insurance policies may include at least two different policies of one or more types selected from the group consisting of medical, dental, vision, and life.

15 Claims, 5 Drawing Sheets

| Diagnostic Code 202 | Description 204 | Cost 206 | Date 208 | Policy 1 210 | Policy 2 212 | Covered Person 214 |
|---|---|---|---|---|---|---|
| 101 | Diagnosis #1 | $196 | | 0 | $124 | Child #1 |
| 2694 | Diagnosis #2 | $210 | | $210 | $160 | Spouse |
| 3200 | Diagnosis #3 | $1234 | | $925 | $1074 | Spouse |
| 94 | Diagnosis #N | $98 | | $63 | 0 | Child #2 |
| | Policy Premium | | | $673 | $538 | Spouse + Child 1 + Child 2 |

| | ⌒220 | ⌒222 | ⌒224 | | | | |
|---|---|---|---|---|---|---|---|
| | ID Code | Prescription Description | Cost | Date | Policy 1 | Policy 2 | Covered Person |
| 228 ⌒ | 26403 | Prescription #1 | $375 | | $324 | Experimental | Self |
| 230 ⌒ | 6924 | Prescription #2 | $210 | | $34 | $29 | Spouse |
| 232 ⌒ | 2119 | Prescription #3 | $129 | | $96 | $104 | Child #1 |
| 234 ⌒ | 3382 | Prescription #N | $98 | | 0 | $48 | Child #2 |
| 226 ⌒ | | Other Costs | | | $976 | $1024 | |
| | Total | | $811 | | $1430 | $1205 | |

FIG. 2B

| Doctor | Specialty | Policy 1 | Policy 2 |
|---|---|---|---|
| Doctor 1 | Obstetrics | $2964 | $4596 |
| Doctor 2 | Obstetrics | $2865 | $3214 |
| Doctor 3 | Ear, nose, throat | $925 | $851 |
| Doctor 4 | Ear, nose, throat | $1046 | $524 |
| Premium | | $1538 | $1673 |

METHOD AND APPARATUS FOR MANAGING THE SELECTION OF BENEFIT OPTIONS

BACKGROUND

In everyday life, people are faced with many different types of choices, such as where they live, which job they will work, where kids will be attending school, etc. Further, people are faced with a myriad of choices in healthcare, insurance, and financial areas, such as which insurance policies to select, which insurance policies to avoid, which insurance policies will pay out more, etc.

In addition to other criteria, people making such decisions are interested in comparing one or more aspects of the available choices such as from a financial standpoint, in order to determine which of those policies would most benefit the person and his or her family.

Presently, the selection of insurance policies such as healthcare and disability care are made based on intuition and superficial review of documentation provided by each insurance company about the policies offered. A person often has little information from which to make informed decisions regarding which medical or other insurance policies, for example, would make the most financial sense.

Typically, when faced with a decision such as which medical insurance policy to purchase, a person selects a policy from between two and four policies offered by different companies. Such a decision may be needed, for example, annually, during a time period when an employer offers new insurance policy choices for medical, life, and other insurance.

Insurance companies typically have a wide variety of features to their policies, with each feature having a different effect on the financial bottom line that the person may face during the upcoming policy year. Each of those features affect different policyholders in different ways. A particular feature which benefits a younger family by reimbursing prenatal care costs and other pregnancy related costs might not benefit a more established family having older kids. However, those two families will typically each receive the same information with which to evaluate insurance choices.

SUMMARY

In one aspect, a method for managing the selection of benefit options includes receiving historical user data covering a first time period, and receiving benefit information including at least one benefit option applicable to a second time period. A first portion of the historical user data is compared with a portion of the benefit information to determine anticipated future costs associated with the at least one benefit option. A user of the method optionally selects one of the available benefit options based on the comparison.

In one or more embodiments of the invention, the benefit options include at least two different insurance policies available for selection. The insurance policies may include at least two different policies of one or more types selected from the group consisting of medical, dental, vision, and life.

In one or more embodiments of the invention, a portion of the historical user data includes historical user health data for at least one member of a household associated with a user. Further, the benefit information optionally includes claims criteria relating at least one medical condition with reimbursement criteria.

Other aspects of the invention will be apparent from the following description and the appended claims.

BRIEF DESCRIPTION OF DRAWINGS

FIGS. 2A, 2B, and 2C show example comparisons according to one or more embodiments of the invention.

DETAILED DESCRIPTION

Figure 1:
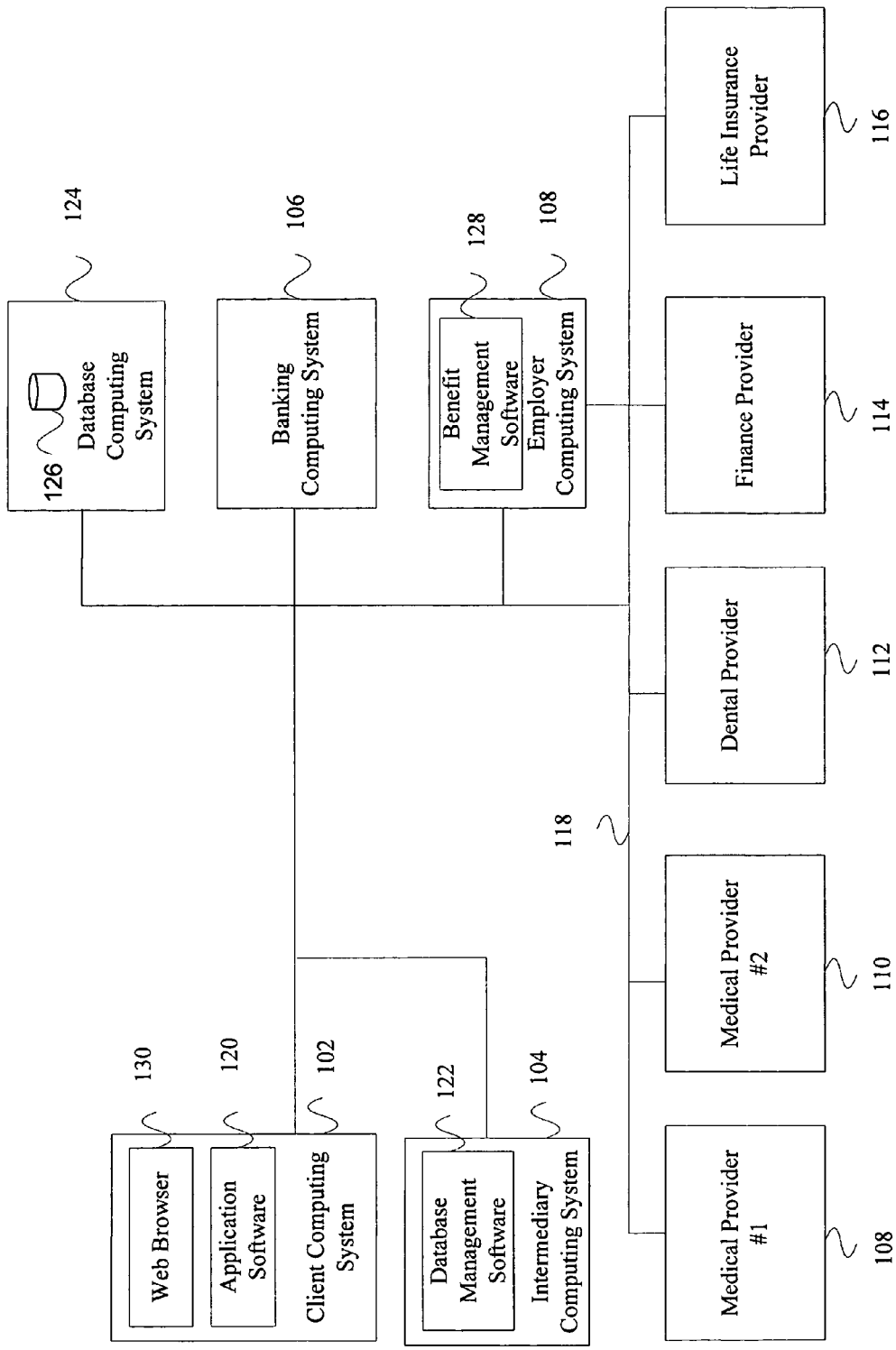
FIG. 1 shows a block diagram according to one or more embodiments of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring this disclosure.

In one aspect, the invention relates to a method facilitating a user to evaluate and select a desired benefit option from among at least two choices of benefit options. In order to ensure that the user is fully informed as to the financial effects associated with a given possible choice, historical information associated with the user or other interested party and applicable to one or more benefit options being considered is evaluated using proposed benefit coverage information such as physician, hospital or other rating criteria, costs, reimbursement levels, etc.

The historical information may contain, but is not limited to, information related to past benefit claims, the frequency of use of one or more past benefits, reimbursement amounts, the names of doctors, prescription and nonprescription drug purchases, and/or other information related to health care. In one embodiment, the historical information includes diagnostic information relating to one or more current or prior medical ailments.

The diagnostic information may include, for example, a numeric code assigned by a physician, a date that a diagnosis occurred, a patient to which the diagnostic information applies, etc. Persons of ordinary skill in the art having the benefit of this disclosure will readily understand the various pieces of information routinely used by medical doctors and other individuals associated with benefits. Those skilled persons will readily appreciate that one or more portions of such diagnostic information may be useful in the practice of this invention.

Diagnostic information may be received from a variety of sources. In one embodiment, a benefits provider that provided benefits over at least a portion of the historical time period provides diagnostic information. Such information is commonly seen, for example, when a medical insurance provider sends a benefit recipient an explanation of benefits. Other sources for diagnostic information include a physician or other medical person providing a diagnosis, a centralized record-keeping facility operating on behalf of a physician, a centralized record-keeping facility operating on behalf of a medical insurance provider, etc. Persons of ordinary skill in the art having the benefit of this disclosure will readily be aware of other possible sources of diagnostic information useful in the practice of this invention.

The historical information, regardless of its source and character, is compared against applicable benefit options to provide a user insight into which medical or other conditions which occurred during the historical time period would be covered by one or more of the new benefit options, and the degree to which such a condition would be covered. In addition to determining whether a given historical event would be reimbursable, a coverage limit and reimbursement level may be provided to the user, resulting in the user knowing whether the particular proposed future policy limits would have been reached or exceeded in one or more areas, etc, based on one or more prior events having taken place, etc.

The historical information and the corresponding benefit information, and resulting comparison, may cover more than one individual, and may cover people that live at the same location, or alternatively live at different locations. By way of example, if an individual is a member of a family having three persons, the historical data may cover one, two, or all three of those individuals, regardless of where those individuals reside. Either of the historical data or any portion of the benefit information should apply to at least one individual that is likely to be covered by the proposed benefit, in order to provide a meaningful analysis of benefit options.

Historical information may be provided, and a portion of that information may be used to help determine what benefit information is needed, in order to provide a proper comparison. The determination of what is needed may be performed locally, or may be performed by a computing system located at, for example, an insurance broker or other provider, an employer offering policy choices, etc.

Once the benefit information is available for comparison, a user may be presented with one or more data screens with which to evaluate the various benefit options and select the benefit option more closely aligned with their needs. In one embodiment, at least one data screen presented to the user has historical cost information for at least one previous diagnosis, and also has at least one benefit amount associated with a previous diagnosis.

The information described in this disclosure may come from many different sources, and may be transmitted in many different ways. FIG. 1 is a block diagram according to one or more embodiments of the invention.

Client computing system 102 is coupled to one or more of intermediary computing system 104, banking computing system 106, medical provider computing systems 108, 110, and 112, finance provider computing system 114, and life insurance provider computing system 116, through transmission lines 118.

In this specification, it is intended that the term "coupled" describe devices which interact with each other, directly or indirectly. For example, first and second devices that interact with each other through a transmission line between the two devices are directly coupled. Further, first and second devices that have intermediate devices disposed between them, and interact with one another through those intermediate devices, are indirectly coupled. In both situations, the first and second devices are considered coupled.

Thus, coupled computing systems are enabled to communicate with each other. Communication between the various entities discussed in this disclosure may take place using any reasonable electronic or nonelectronic method, and is therefore not limited to communicating using computer systems and networks. Further, communication may take place using wired networks, wireless networks, or any other medium known to persons of ordinary skill.

Historical information related to the use of one or more past benefits such as insurance reimbursement is collected over a period of time. This historical information may be collected by a benefit consumer, using manual means or with the assistance of a computing system such as client computing system 102. The historical information may alternatively be collected by one or more benefit providers or their representatives, using, for example, any of intermediary computing system 104, banking computing system 106, medical provider computing systems 108, and 110, dental provider computing system 112, finance provider computing system 116, and life insurance provider computing system 116.

The historical data is compared with benefit information for the one or more benefits being proposed as choices for a proposed future time period. For example, an employer offering insurance benefit choices for the coming year may put together two or more choices for medical insurance, dental insurance, or other benefits requiring a choice be made by an employee.

If the historical data is present on a client computing system such as client computing system 102, benefit information relating to the benefit choices being offered for the future time period may be downloaded from one or more benefit providers or intermediaries to the client computing system for evaluation. In one embodiment of the invention, application software such as application software 120 on client computing 102 manages the download of relevant information from a benefit provider computing system, an employer computing system, or intermediary computing system, as needed.

The determination of a proper computing system from which to download needed data may be made in many ways. In one embodiment of the invention, application software 120 has functionality enabling it to interface with database management software 122 on intermediary computing system 104 to access information stored in database computing system 124. Alternatively, functionality within application software 120 enables application software 120 to directly interact with database 126 on database computing system 124.

If an employer is managing benefit options being provided to its employees, the benefit data may be provided to the employer and that benefit data then provided, as needed, to one or more employees. Alternatively, the employer may provide information as to where the benefit data is located such as on finance provider computing system 114 or life insurance provider computing system 116, so that application software 120 on client computing system 102 can retrieve that data.

In one embodiment of the invention, database computing system 124 is coupled to client computing system 102, intermediary computing system 104, and other computing systems as necessary through transmission lines 118. Thus, in one example, an intermediary computing system 104 manages a centralized database 126 which has benefit data from one or more benefit providers stored therein.

When an employer or other benefit coordinator indicates, through benefit management software 128, or otherwise, that one or more benefit providers are associated with a benefit offering being made for a particular time period, application software 120 receives information about one or more of those benefit providers and provides a comparison of the historical information with the proposed benefit information, for user review.

Alternative to application software 120 managing the collection of benefit data and of providing the comparison of that benefit data to historical data that may have been collected by a user of client computing system 102, benefit management software 128 on employer computing system 108 or any other intermediary computer systems such as intermediary computing system 104 could have software functionality which includes these functions. In one embodiment of the invention a user of client computing system 102 accesses such functionality through web browser 130, uploading historical data as necessary and viewing the comparison provided by benefit management software 128 or other software on intermediary computing system 104 remotely through the web browser 130.

Persons of ordinary skill in the art having the benefit of this disclosure will readily recognize that there are many ways to designate particular download locations where data is stored and from which application software such as application software 120 may download needed data.

FIGS. 2A, 2B, and 2C show example comparisons according to one or more embodiments of the invention.

In one embodiment of the invention, a comparison of historical data and proposed benefit data provided to a user, such as a user of the client computing system 102, is presented as a screen having rows and columns. In one example seen in FIG. 2A, column 202 has medical diagnostic codes relating to medical diagnosis taking place at some point during the historical time period. Correspondingly, in this example, rows 204, 206, and 208 list a description, cost, and date of the diagnosis. The cost may be for an office visit, a medical procedure, etc. Columns 210 and 212 reflect benefit amounts payable under one or more insurance policies, such as a historical or current policy, one or more new proposed policies, two or more proposed policies, etc. In one embodiment of the invention, column 214 is optionally provided, as necessary, to list a covered person (or a proposed covered person, in the event of the user modifying the data for circumstances the user believes will occur during a future time).

In a second example seen in FIG. 2B, comparisons are made regarding prescription drugs that may have been prescribed over a given time period being considered, for one or more persons.

Columns 220, 222, and 224 optionally include one or more of the identification number, name, and total cost of the drug being prescribed, respectively. Like the comparison of FIG. 2A, the comparison of FIG. 2B compares one or more historical events with one or benefit providers to understand the coverage associated with the one or more benefit providers. Although two benefit providers, insurance companies in this example, are shown, it may be useful to only show one benefit provider, such as a future benefit provider. Showing one benefit provider would enable discovery of what the one benefit provider reimburses or otherwise provides, even if comparison with a second benefit provider (e.g. a historical provider, or a future proposed benefit provider) is not desired.

Row 226 is provided to enable the comparison to include a total cost picture, if desired. Thus, row 226 is intended to reflect one or more costs that may not be evident in, but which is associated with, the data presented in rows 228, 230, 232, and 234.

Referring now to FIG. 2C, a comparison may be made of different physicians that are of interest. As an example, information relating to one or more physicians used in the past, such as the physician shown at row 240, is compared with one or more physicians offered through a proposed benefit provider, at row 242.

Alternatively, the physicians represented at rows 240 and 242 could either both be historical and the comparison could be made in order to determine if a proposed benefit provider has coverage relating to those physicians.

In another example, physicians represented at rows 244 and 246 are not historical providers, but are physicians selected from coverage being proposed by one or more proposed benefit provider. Historical physician visit data is used to determine anticipated coverage, if services associated with the selected physicians are utilized. Again, at 248, other data of relevance such as cost data may optionally be presented, in order to determine an overall cost picture.

A comparison of historical data and proposed benefit data as seen here may include data relating to one person or may include data relating to many, as needed in order for the user to properly evaluate a proposed benefit. In one embodiment of the invention, functionality is provided to a user to add, delete or otherwise modify diagnostic or other information such as the persons the comparison covers (e.g. a child dependant, a spouse, etc.) and various details relating to one or more persons covered (e.g. whether one had a baby during the period covered by the historical information, or anticipates having one during a period covered by a period covered by a future proposed benefit) in order to better understand how the proposed benefit will affect them during the period the proposed benefit will be in force.

Figure 3:
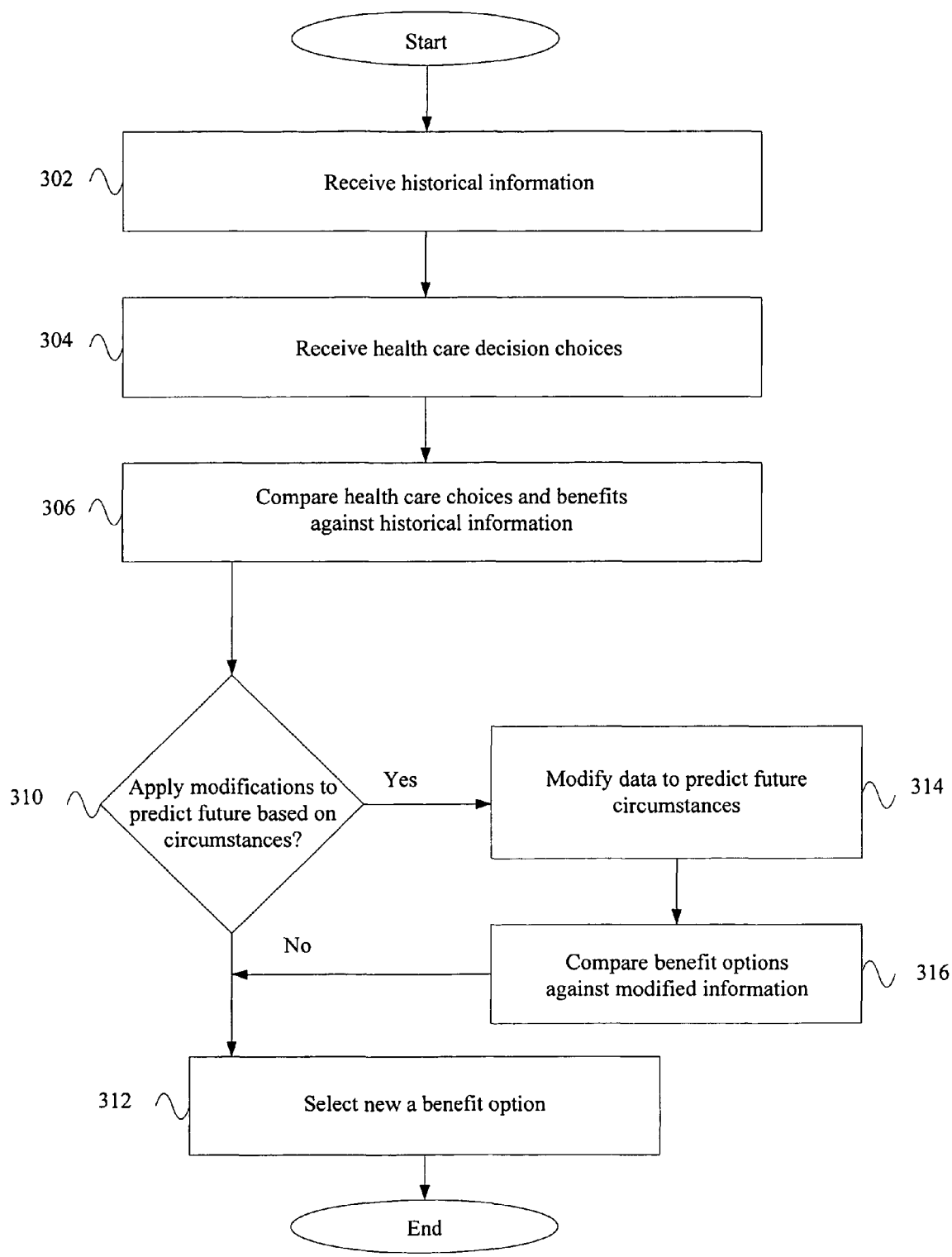
FIG. 3 shows a flowchart according to one or more embodiments of the present invention.

Persons of ordinary skill in the art having the benefit of this disclosure will readily be aware that there are many different ways to receive proposed benefit information, and to compare one or more portions of that benefit information with one or more portions of the historical information. FIG. 3 shows a flowchart according to one or more embodiments of the invention.

At 302, a user received an explanation of benefits, one example of historical information that may be used when practicing one or more embodiments of the invention.

At 304, two or more health care decision choices are received, at a client computing system such as client computing system 102 or employer computing system 108 (also of FIG. 1). Possible health care decision choices include, but are not limited to, medical, dental, vision, and life insurance choices, or any combination thereof.

At 306, health care or other benefit proposals received at 304 are compared against historical information received at 302. In one embodiment of the invention, a user is presented with a screen having one or more portions of historical information compared with applicable benefit provisions of one or more proposed benefit options.

At 308, a determination is made as to whether modifications are desired as to the circumstances under which the comparison is being made. As an example, it is determined whether it is desired that one or more portions of the historical information should not be included in the comparison, perhaps because that information relates to one or more items or events not expected to occur during the future benefit period.

If no modifications to the comparison are desired, the method proceeds at 312 when a benefit option is selected from the options provided at 304. If one or more modifications are desired, additions, deletions or changes are made, at 314. In one embodiment of the invention, at least one addition is made to the comparison in order to add a potential medical condition, diagnosis, new dependant to consider, etc. that was not present in the historical information. In one embodiment of the invention, at least one deletion is made from the comparison in order to delete a medical condition, diagnosis, dependant, etc. that was present in the historical information but not expected to apply in the time period applying to the proposed benefit options.

At 316, a new comparison is prepared for the user, including the modified information as compared against one or more of the proposed benefit options. The method proceeds again at 312 when a benefit option is selected from the options provided at 304. Optionally, the selection of a benefit option includes the registration for, and enrollment in, the selected benefit option.

Embodiments have been presented where real life historical data is provided and compared by a user against one or more proposed benefit options to assist in the determination of a provider to select. In one embodiment of the invention, a quantitative assessment of proposed benefit coverage is performed automatically, using user-selectable criteria to provide an overall recommendation to a user of which benefit option to select.

Example criteria may include, but is not limited to, the degree to which historical services providers are covered under a proposed benefit provider, the distance one or more physicians are from the home of one or more persons to be covered by a proposed benefit provider, the overall cost of using the services of one or more physicians based on historical data pertaining to the diagnosis and treatment of medical conditions, or other service use.

Other example criteria may include, but is not limited to, total cost to a user using a list of selected physicians (whether associated with a proposed benefit, or not), based on historical data, the amount of out of pocket expenses expected, the max out of pocket expense required for a given proposed benefit option, a per-person deductible, a total family deductible, etc.

Computer code implementing the methods presented in this disclosure may be stored in memory within a computer, or may alternatively be stored in more permanent computer readable medium such as hard drives, optical disks, compact disks, and magnetic tape. Further, such code may be transferred over communications networks with or without a carrier wave.

Software instructions to perform embodiments of the invention may be stored on a computer readable medium such as a flash memory, compact disc (CD), hard disk drive, diskette, a tape, or any other computer readable storage device.

Advantages to the present invention which may be seen when practicing the invention include users having the ability to compare real life experiences and events and past benefits against proposed future benefit options. Thus, rather than a user making a benefit choice based on a qualitative review of a previous benefit period, a user may make an informed comparison of proposed benefit options, based on real world data, as optionally modified to provide as accurate a comparison as possible.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for comparing medical insurance policies (MIPs), comprising:
   receiving electronically, from a benefits provider and a banking computing system, a plurality of historical user data identifying a plurality of medical conditions of a patient and a plurality of physician visits during a first time period for treatment of the plurality of medical conditions;
   identifying a plurality of benefits offered by a first MIP and a second MIP, wherein the first MIP and the second MIP are applicable to a second time period after the first time period;
   receiving, from the patient, a selection of a first plurality of physicians identified in the plurality of benefits and practicing a first medical specialty corresponding to a first medical condition of the patient;
   receiving, from the patient, a selection of a second plurality of physicians identified in the plurality of benefits and practicing a second medical specialty corresponding to a second medical condition of the patient;
   determining, by a processor and based on the plurality of physician visits and the plurality of benefits, a first plurality of dollar amounts corresponding to anticipated coverage, by the first MIP, of a plurality of services provided by the first plurality of physicians and the second plurality of physicians during the second time period;
   determining, by the processor and based on the plurality of physician visits and the plurality of benefits, a second plurality of dollar amounts corresponding to anticipated coverage, by the second MIP, of the plurality of services provided by the first plurality of physicians and the second plurality of physicians during the second time period;
   displaying, to the patient, a grid comprising a first column identifying the first plurality of physicians and the second plurality of physicians, a second column identifying the first medical specialty and the second medical specialty, a third column corresponding to the first MIP and identifying the first plurality of dollar amounts, and a fourth column corresponding to the second MIP and identifying the second plurality of dollar amounts; and
   receiving, after displaying the grid, a request to enroll the patient in at least one selected from a group consisting of the first MIP and the second MIP.

2. The method of claim 1, wherein the grid comprises a row displaying a first premium for the first MIP and a second premium for the second MIP.

3. The method of claim 1, wherein the plurality of historical user data comprises a plurality of medical diagnoses, and wherein the plurality of medical conditions are identified based on the plurality of medical diagnoses.

4. The method of claim 1, further comprising:
   modifying the plurality of historical user data prior to determining the first plurality of dollar amounts.

5. The method of claim 4, wherein modifying the plurality of historical user data comprises deleting a third medical condition of the patient, wherein the third medical condition is not expected during the second time period.

6. A non-transitory computer readable storage medium storing a plurality of instructions for comparing medical insurance policies (MIPs), the plurality of instructions comprising functionality for:
   receiving electronically, from a benefits provider and a banking computing system, a plurality of historical user data identifying a plurality of medical conditions of a patient and a plurality of physician visits during a first time period for treatment of the plurality of medical conditions;
   identifying a plurality of benefits offered by a first MIP and a second MIP, wherein the first MIP and the second MIP are applicable to a second time period after the first time period;
   receiving, from the patient, a selection of a first plurality of physicians identified in the plurality of benefits and practicing a first medical specialty corresponding to a first medical condition of the patient;
   receiving, from the patient, a selection of a second plurality of physicians identified in the plurality of benefits and practicing a second medical specialty corresponding to a second medical condition of the patient;
   determining, based on the plurality of physician visits and the plurality of benefits, a first plurality of dollar amounts corresponding to anticipated coverage, by the first MIP, of a plurality of services provided by the first plurality of physicians and the second plurality of physicians during the second time period;

determining, based on the plurality of physician visits and the plurality of benefits, a second plurality of dollar amounts corresponding to anticipated coverage, by the second MIP, of the plurality of services provided by the first plurality of physicians and the second plurality of physicians during the second time period;

displaying, to the patient, a grid comprising a first column identifying the first plurality of physicians and the second plurality of physicians, a second column identifying the first medical specialty and the second medical specialty, a third column corresponding to the first MIP and identifying the first plurality of dollar amounts, and a fourth column corresponding to the second MIP and identifying the second plurality of dollar amounts; and receiving, after displaying the grid, a request to enroll the patient in at least one selected from a group consisting of the first MIP and the second MIP.

7. The non-transitory computer readable storage medium of claim 6, wherein the grid comprises a row displaying a first premium for the first MIP and a second premium for the second MIP.

8. The non-transitory computer readable storage medium of claim 6, wherein the plurality of historical user data comprises a plurality of medical diagnoses, and wherein the plurality of medical conditions are identified based on the plurality of medical diagnoses.

9. The non-transitory computer readable storage medium of claim 6, the plurality of instructions further comprising functionality for:
modifying the plurality of historical user data prior to determining the first plurality of dollar amounts.

10. The non-transitory computer readable storage medium of claim 9, wherein modifying the plurality of historical user data comprises deleting a third medical condition of the patient, wherein the third medical condition is not expected during the second time period.

11. A system for comparing medical insurance policies (MIPs), comprising:
a processor;
a memory operatively connected to the processor; and
a plurality of instructions stored in the memory and comprising functionality for:
receiving electronically, from a benefits provider and a banking computing system, a plurality of historical user data identifying a plurality of medical conditions of a patient and a plurality of physician visits during a first time period for treatment of the plurality of medical conditions;
identifying a plurality of benefits offered by a first MIP and a second MIP, wherein the first MIP and the second MIP are applicable to a second time period after the first time period;
receiving, from the patient, a selection of a first plurality of physicians identified in the plurality of benefits and practicing a first medical specialty corresponding to a first medical condition of the patient;
receiving, from the patient, a selection of a second plurality of physicians identified in the plurality of benefits and practicing a second medical specialty corresponding to a second medical condition of the patient;
determining, based on the plurality of physician visits and the plurality of benefits, a first plurality of dollar amounts corresponding to anticipated coverage, by the first MIP, of a plurality of services provided by the first plurality of physicians and the second plurality of physicians during the second time period;
determining, based on the plurality of physician visits and the plurality of benefits, a second plurality of dollar amounts corresponding to anticipated coverage, by the second MIP, of the plurality of services provided by the first plurality of physicians and the second plurality of physicians during the second time period;
displaying, to the patient, a grid comprising a first column identifying the first plurality of physicians and the second plurality of physicians, a second column identifying the first medical specialty and the second medical specialty, a third column corresponding to the first MIP and identifying the first plurality of dollar amounts, and a fourth column corresponding to the second MIP and identifying the second plurality of dollar amounts; and
receiving, after displaying the grid, a request to enroll the patient in at least one selected from a group consisting of the first MIP and the second MIP.

12. The system of claim 11, wherein the grid comprises a row displaying a first premium for the first MIP and a second premium for the second MIP.

13. The system of claim 11, wherein the plurality of historical user data comprises a plurality of medical diagnoses, and wherein the plurality of medical conditions are identified based on the plurality of medical diagnoses.

14. The system of claim 11, the plurality of instructions further comprising functionality for:
modifying the plurality of historical user data prior to determining the first plurality of dollar amounts.

15. The system of claim 14, wherein modifying the plurality of historical user data comprises deleting a third medical condition of the patient, wherein the third medical condition is not expected during the second time period.

* * * * *